United States Patent
Blush et al.

(10) Patent No.: US 11,802,436 B2
(45) Date of Patent: Oct. 31, 2023

(54) VACUUM INSULATED GLASS (VIG) WINDOW UNIT WITH METAL ALLOY SPACERS, AND/OR METHODS OF MAKING THE SAME

(71) Applicant: GUARDIAN GLASS, LLC, Auburn Hills, MI (US)

(72) Inventors: Jason Blush, Milford, MI (US); Jason Theios, Auburn Hills, MI (US); Timothy Hodapp, Auburn Hills, MI (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 0 days.

(21) Appl. No.: 17/138,587

(22) Filed: Dec. 30, 2020

(65) Prior Publication Data

US 2022/0205311 A1 Jun. 30, 2022

(51) Int. Cl.
E06B 3/663 (2006.01)
C22C 16/00 (2006.01)
E06B 3/66 (2006.01)

(52) U.S. Cl.
CPC .......... *E06B 3/66304* (2013.01); *C22C 16/00* (2013.01); *E06B 3/6612* (2013.01); *C22C 2200/02* (2013.01)

(58) Field of Classification Search
CPC ................. F06B 3/663; F06B 3/66304; F06B 2003/6638; C22C 16/00; C22C 2200/02; Y02B 80/22; Y02A 30/249; B32B 17/061; B32B 17/10192; B32B 17/1022
See application file for complete search history.

(56) References Cited

U.S. PATENT DOCUMENTS

| | | | |
|---|---|---|---|
| 5,657,607 A | 8/1997 | Collins et al. | |
| 5,664,395 A | 9/1997 | Collins et al. | |
| 5,902,652 A | 5/1999 | Collins et al. | |
| 6,210,763 B1 * | 4/2001 | Katoh | E06B 3/66304 52/786.13 |
| 6,420,002 B1 * | 7/2002 | Aggas | E06B 3/66304 52/786.13 |

(Continued)

FOREIGN PATENT DOCUMENTS

| | | |
|---|---|---|
| CN | 101891404 A | 11/2010 |
| EP | 0963961 A1 | 12/1999 |

(Continued)

OTHER PUBLICATIONS

Rolinski et al. "The Benefits of Nitriding and Nitrocarburizing" https://www.machinedesign.com/materials/article/21836791/the-benefits-of-nitriding-and-nitrocarburizing. published Jun. 1, 2018 (Year: 2018).*

(Continued)

*Primary Examiner* — Nancy R Johnson

(57) ABSTRACT

A vacuum insulated glass (VIG) window unit includes an array of spacers provided between at least a pair of substrates, such as glass substrate. Certain example embodiments relate to a VIG window unit including spacers (e.g., pillars) of or including a metal alloy. The metal alloy of the spacer may be an amorphous metal alloy (e.g., Zr and/or Cu based amorphous alloy). Such metal alloy spacers advantageously reduce the thermal conductivity of the spacer array and can increase the center of glass R-value of the VIG window unit.

24 Claims, 2 Drawing Sheets

(56) References Cited

U.S. PATENT DOCUMENTS

| | | |
|---|---|---|
| 10,435,938 B2 | 10/2019 | Dennis et al. |
| 10,465,433 B2 | 11/2019 | Hogan et al. |
| 10,590,695 B2 | 3/2020 | Veerasamy |
| 10,683,695 B2 | 6/2020 | Veerasamy et al. |
| 10,703,667 B2 | 7/2020 | Cooper |
| 2014/0272208 A1 | 9/2014 | Song et al. |
| 2021/0115727 A1* | 4/2021 | Krisko .................. E06B 3/6612 |

FOREIGN PATENT DOCUMENTS

| | | |
|---|---|---|
| WO | 0112941 A1 | 2/2001 |
| WO | 2020002126 A1 | 1/2020 |

OTHER PUBLICATIONS

International Search Report and written Opinion received for PCT Application No. PCT/IB2021/062359, dated Apr. 11, 2022, 13 Pages.

* cited by examiner

VACUUM INSULATED GLASS (VIG) WINDOW UNIT WITH METAL ALLOY SPACERS, AND/OR METHODS OF MAKING THE SAME

FIELD OF THE INVENTION

Certain example embodiments of this invention relate to spacers used in vacuum insulated glass (VIG) window units. More particularly, certain example embodiments of this invention relate to a VIG window unit including spacers (e.g., pillars) of or including a metal alloy. Metal alloy spacers (e.g., Ti, Cu, and/or Zr inclusive alloy) have been found to have lower thermal conductivity, and increase compressive strength, compared to conventional annealed 316 stainless steel spacers. In certain example embodiments, metal content of the spacer comprises, by weight, at least 30% (more preferably at least 40%, and most preferably at least 50%) Ti, Cu and/or Zr. The metal alloy of the spacer(s) may be an amorphous metal alloy (e.g., Zr and/or Cu based amorphous alloy) in certain example embodiments. Thus, it has been found that using metal alloy spacers (e.g., Ti, Cu, and/or Zr inclusive alloy) advantageously reduces the thermal conductivity of the spacer array and increases the center of glass R-value of the VIG window unit, and can also provide for sufficient spacing strength of the substrates of the VIG window unit. Increasing the compressive yield strength of the spacers in such a manner may allow for increased spacing between adjacent spacers in the window unit, which may allow for higher R-values to be achieved.

BACKGROUND AND SUMMARY OF EXAMPLE EMBODIMENTS OF THE INVENTION

Vacuum IG units are known in the art. For example, see U.S. Pat. Nos. 5,664,395, 5,657,607, and 5,902,652, the disclosures of which are all hereby incorporated herein by reference.

FIGS. 1-2 illustrate a conventional vacuum IG unit (vacuum IG unit or VIG unit). Vacuum IG unit 1 includes two spaced apart glass substrates 2 and 3, which enclose an evacuated or low pressure space 6 therebetween. Glass sheets/substrates 2 and 3 are interconnected by peripheral or hermetic edge seal of fused solder glass 4 (or other suitable material) and an array of support spacers (e.g., pillars) 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space 6, having a pressure less than atmospheric pressure. After evacuation, tube 8 is melted to seal the vacuum. Recess 11 retains sealed tube 8. Optionally, a chemical getter 12 may be included within recess 13 or at other suitable location.

A known spacer material, for spacers 5, is annealed 316 stainless steel. Unfortunately, 316 stainless steel has combination of thermal conductivity of 13.5 W/m-K and compressive yield strength of 42,000 psi. This combination of low compressive yield strength, and medium to high thermal conductivity, means that the spacers in the VIG window unit cannot be spaced too far from each other (i.e., must be located reasonably close to each other to prevent failure) which in turn contributes to the VIG window unit having an R-value of about R-12.

It is possible to increase 316 stainless steel's compressive yield strength compared to the annealed state through strain hardening. However, strain hardening increases the amount of martensite in the structure causing it to be ferromagnetic, and highly magnetic spacers cause issues during the manufacturing process. Moreover, most pure metals have high thermal conductivity values and low compressive yield strength.

Thus, it will be appreciated that there is a need in art to find a solution to the problems discussed above, such as, for example, one or more of: (i) finding a solution enabling higher R-values to be achieved for VIG window units while not significantly sacrificing strength; (ii) providing a spacer material having higher compressive yield strength compared to annealed 316 stainless steel, without being significantly magnetic; and/or (iii) providing a spacer material having lower thermal conductivity compared to 316 stainless steel.

In certain example embodiments of this invention, it has been found that alloying metals increases both resistance to compressive plastic deformation and decreases the thermal conductivity. Thus, it has been found that such alloys are particularly advantageous for spacers in VIG window units. Certain example embodiments of this invention relate to a VIG window unit including spacers (e.g., pillars) of or including a metal alloy. Metal alloy spacers (e.g., Ti, Cu, and/or Zr inclusive alloy) have been found to have lower thermal conductivity, and increased compressive strength, compared to conventional annealed 316 stainless steel spacers. In certain example embodiments, metal content of the spacer comprises, by weight, at least 30% (more preferably at least 40%, and most preferably at least 50%) Ti, Cu and/or Zr. The metal alloy of the spacer(s) may be an amorphous metal alloy (e.g., Zr and/or Cu based amorphous alloy) in certain example embodiments. For example, the spacers may be of or include a Zr-based amorphous metal alloy comprising Zr and one or more of Cu, Ni, Al, and/or Ti, where the Zr content by weight is at least about 30%, more preferably at least about 40%, and most preferably at least about 50%, and sometimes at least about 60%. An another example, the spacers may be of or include a Ti-based metal alloy comprising Ti and one or more of Al and/or V, where the Ti content by weight is at least about 30%, more preferably at least about 40%, and most preferably at least about 50%, and sometimes at least about 60% or at least about 80%. Thus, it has been found that using metal alloy spacers (e.g., Ti, Cu, and/or Zr inclusive alloy) advantageously reduces the thermal conductivity of the spacer array and increases the center of glass R-value of the VIG window unit, and can also provide for sufficient spacing strength of the substrates of the VIG window unit. Increasing the compressive yield strength of the spacers in such a manner may allow for increased spacing between adjacent spacers in the window unit, which may allow for higher R-values to be achieved.

In certain example embodiments of this invention, there is provided a vacuum insulated glass (VIG) window unit, comprising: first and second spaced apart glass substrates defining a gap therebetween; an edge seal provided proximate a periphery of the first and second substrates to form an hermetic seal, and help define the gap which is at a pressure less than atmospheric pressure; a plurality of spacers provided between at least the first and second glass substrates of the VIG window unit for helping space apart at least the first and second glass substrates; and wherein the spacers comprise a metal alloy having a thermal conductivity of no greater than 13.0 W/m-K and a compressive yield strength of at least 80,000 psi. The metal alloy may optionally be nitrided.

In certain example embodiments, the metal alloy may comprise Ti as the largest metal element, and Ti content of the metal alloy, by weight, may be at least about 30%, more preferably at least about 50%, and most preferably at least about 80%.

In certain example embodiments, the metal content of the metal alloy may comprise, by weight, at least 50% Ti, from about 1-20% Al, and from about 1-20% V.

The metal alloy may be amorphous, comprising a non-crystalline structure. Zr or Cu may be the largest metal element content of the amorphous metal alloy. Metal content of the metal alloy (e.g., amorphous) may comprise, by weight, at least 40% Zr and from about 1-35% Cu, and at least one of: from about 1-30% Ni, from about 1-15% Ti, and/or from about 1-15% Al; may comprise, by weight, at least 40% Zr and from about 1-35% Cu, and at least one of: from about 1-15% Nb and/or from about 1-15% Al; and/or may comprise, by weight, at least 30% Cu and from about 1-35% Ti, and at least one of: from about 1-35% Zr, from about 1-20% Ni, and/or from about 1-15% Sn.

In certain example embodiments of this invention, there is provided a vacuum insulated glass (VIG) window unit, comprising: first and second spaced apart glass substrates defining a gap therebetween; an edge seal provided proximate a periphery of the first and second substrates to form an hermetic seal, and help define the gap which is at a pressure less than atmospheric pressure; a plurality of spacers provided between at least the first and second glass substrates of the VIG window unit for helping space apart at least the first and second glass substrates; and wherein the spacers comprise a metal alloy having Ti as the largest metal element in the metal alloy, and wherein Ti content of the metal alloy, by weight, is at least about 50%.

In certain example embodiments of this invention, there is provided a vacuum insulated glass (VIG) window unit, comprising: first and second spaced apart glass substrates defining a gap therebetween; an edge seal provided proximate a periphery of the first and second substrates to form an hermetic seal, and help define the gap which is at a pressure less than atmospheric pressure; a plurality of spacers provided between at least the first and second glass substrates of the VIG window unit for helping space apart at least the first and second glass substrates; and wherein the spacers comprise an amorphous metal alloy, wherein Zr or Cu is the largest metal element of the amorphous metal alloy.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 2:
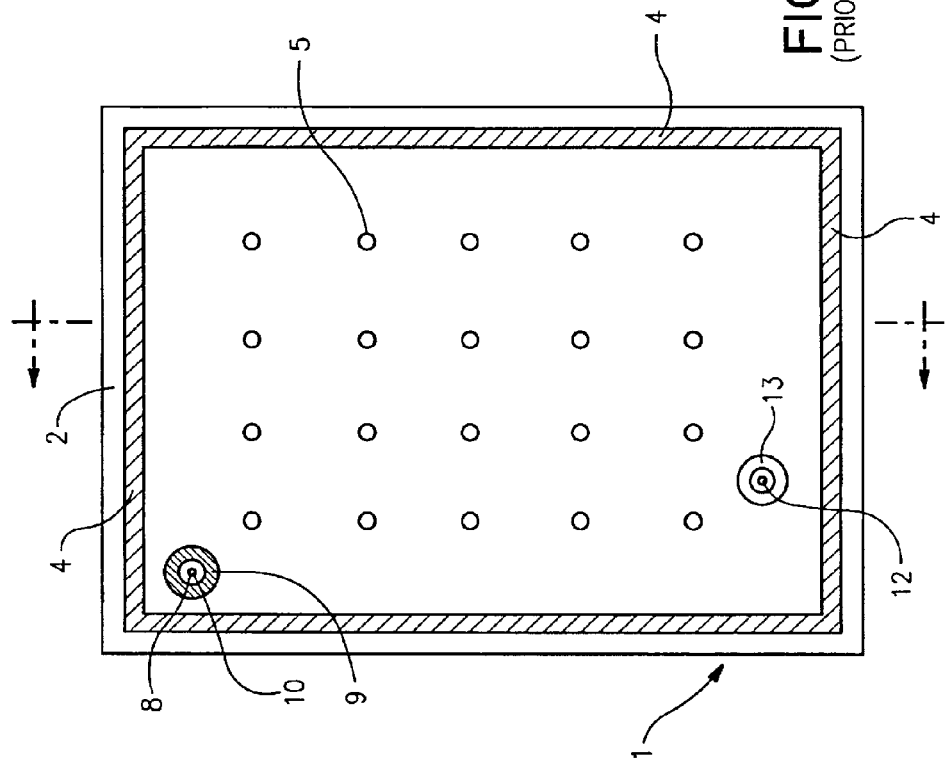
FIG. 2 is a prior art top plan view of the bottom substrate, edge seal, and spacers of the FIG. 1 vacuum IG unit taken along the section line illustrated in FIG. 1.

Referring now more particularly to the accompanying drawings in which like reference numerals indicate like parts throughout the several views.

Figure 1:
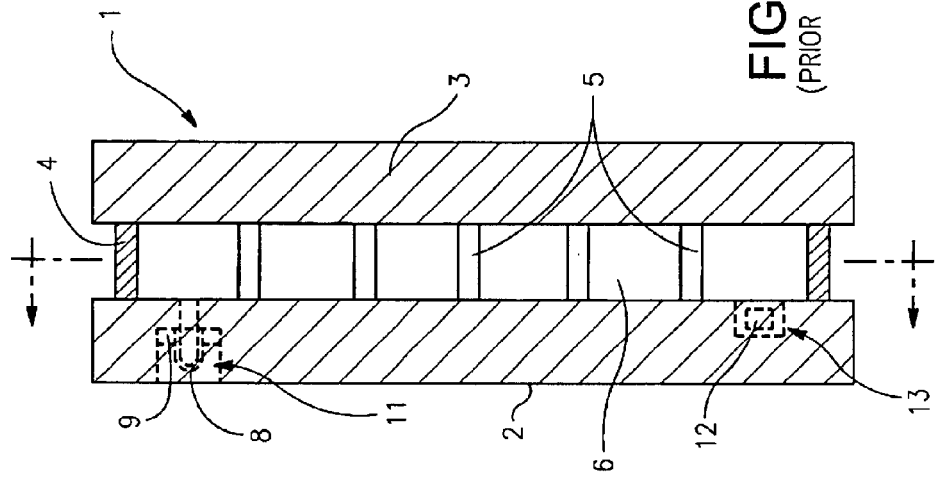
FIG. 1 is a prior art cross-sectional view of a conventional vacuum IG unit.

FIGS. 1-2 illustrate an example vacuum IG unit (vacuum IG unit or VIG unit). VIG window unit 1 includes two spaced apart substantially parallel glass substrates 2 and 3, which enclose an evacuated or low pressure space 6 therebetween. Glass sheets/substrates 2 and 3 are interconnected by peripheral or hermetic edge seal 4 of fused solder glass or other suitable material, and an array of support spacers (e.g., pillars) 5. Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space 6, having a pressure less than atmospheric pressure. After evacuation, tube 8 is melted to seal the vacuum, and the spacers 5 space at least the glass substrates 2 and 3 from each other. Recess 11 retains sealed tube 8. Optionally, a chemical getter 12 may be included within recess 13 or at other suitable location.

Certain example embodiments of this invention relate to a VIG window unit including spacers (e.g., pillars) of or including a metal alloy. Metal alloy spacers (e.g., Ti, Cu, and/or Zr inclusive alloy) have been found to have lower thermal conductivity, and increased compressive strength, compared to conventional annealed 316 stainless steel spacers. In certain example embodiments, metal content of the spacers 5 comprises, by weight, at least 30% (more preferably at least 40%, and most preferably at least 50%) Ti, Cu and/or Zr. The metal alloy of the spacer(s) may be an amorphous metal alloy (e.g., Zr and/or Cu based amorphous alloy) in certain example embodiments. In certain example embodiments of this invention, material for spacers 5 is designed to advantageously provide for one or more of: (i) increased center of glass R-values (e.g., at least 11.1, more preferably at least 12.0, more preferably of at least 13.0, and sometimes at least 14.0, as a function of spacer spacing) for VIG window units while not significantly sacrificing strength; (ii) providing a spacer material having higher compressive yield strength compared to annealed 316 stainless steel, without being significantly magnetic; and/or (iii) providing a spacer material having lower thermal conductivity compared to 316 stainless steel.

In example embodiments of this invention, alloying metals increases both resistance to compressive plastic deformation and decreases the thermal conductivity, for material for spacers 5. It has been found that such metal alloys are particularly advantageous for spacers in VIG window units.

Figure 3:
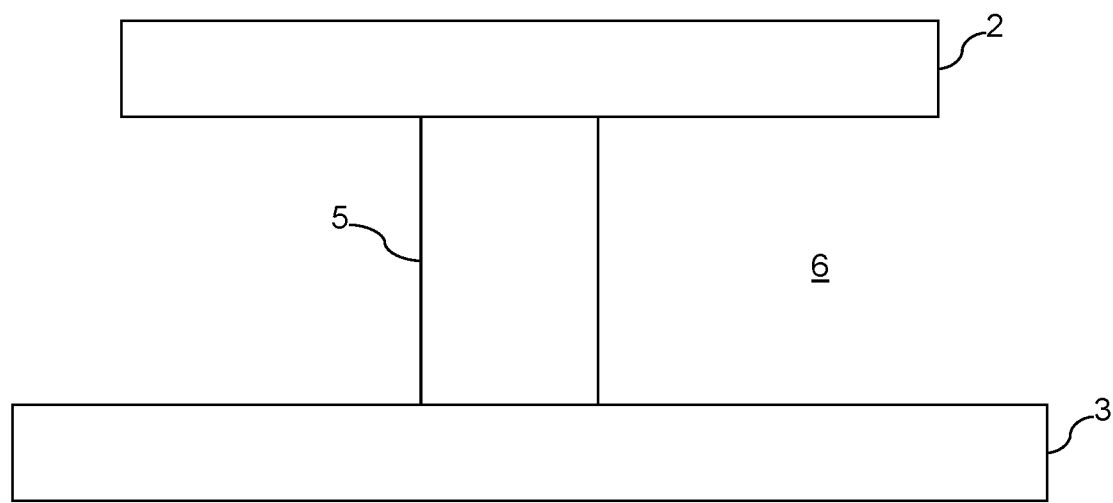
FIG. 3 is side view of a metal alloy spacer that may be used in the VIG window unit of FIGS. 1-2, or any other VIG window unit, according to example embodiments of this invention.

Certain example embodiments of this invention relate to a VIG window unit including spacers (e.g., pillars) 5 of or including a metal alloy. The metal alloy spacers 5 are provided between at least glass substrates 2 and 3, as shown in FIGS. 1-3. The metal alloy spacers 5 of FIG. 3 may be used in the VIG window unit of FIGS. 1-2, or in any other VIG window unit, according to example embodiments of this invention. For example, the metal alloy spacers 5 discussed herein and/or shown in FIG. 3 may be used in any of the VIG window units described in any of U.S. Pat. Nos. 5,664,395, 5,657,607, 5,902,652, 10,703,667, 10,683,695, 10,590,695, 10,465,433, and/or 10,435,938, the disclosures of which are all hereby incorporated herein by reference.

Metal alloy spacers 5 (e.g., Ti, Cu, and/or Zr inclusive alloy), shown in FIG. 3, have been found to have lower thermal conductivity, and increased compressive strength, compared to conventional annealed 316 stainless steel spacers. In certain example embodiments, metal content of the spacer comprises, by weight, at least 30% (more preferably at least 40%, and most preferably at least 50%) Ti, Cu and/or Zr. The metal alloy of the spacer(s) may be an amorphous metal alloy (e.g., Zr and/or Cu based amorphous alloy) in certain example embodiments. Example spacer materials are listed in the chart below. It can be seen that most pure metals (e.g., see Al, Ni, Zr, and Ti in the chart below) have high thermal conductivity values and low compressive yield strength, which are undesirable for use in VIG spacers 5. Decreasing the thermal conductivity will reduce the amount of heat transferring between the pieces of glass.

| Material | Thermal Conductivity | Compressive Yield Strength |
|---|---|---|
| Aluminum (Pure)* | 236 W/m-K | |
| Nickel (Pure)* | 94 W/m-K | |
| Zirconium (Pure)* | 23 W/m-K | |
| Titanium (Pure)* | 22 W/m-K | |
| Stainless steel (316 Annealed) | 13.5 W/m-K | 42,000 psi |
| Hastelloy C276 | 9.9 W/m-K | 163,000 psi |
| Titanium 6-4 (Solution aged) | 6.7 W/m-K | 155,000 psi |
| Titanium 6-4 (STA & Nitrided) | 6.7 W/m-K | 290,000 psi |
| Titanium 6-5-.5-.25 (Timet 685) | 4.15 W/m-K | ~125,000 psi |

(*Cond. at 0° C.; NPL)

Alloying the pure metals increase both resistance to compressive plastic deformation and decreases the thermal conductivity. Increasing the compressive yield gives the ability to increase the space between each individual pillars reducing the number of sites where thermal conduction can occur between the pieces of glass. Titanium based alloy Ti-6Al-4V (also known as Titanium 6-4) is an example material for spacers 5 according to an example of this invention, and is made up of for example about 6% Al, about 4% V, and about 90% Ti. It can be seen, for example, that example spacer 5 material alloys such as Ti-6Al-4V (also known as Titanium 6-4), Timet 685, and Hastelloy C276 all have lower thermal conductivity and significantly higher compressive yield strength than does annealed 316 stainless steel. Thus, it will be appreciated that example spacer 5 material alloys such as Ti-6Al-4V (also known as Titanium 6-4), Timet 685, and Hastelloy C276 represent significant improvements over annealed 316 stainless steel with respect to spacer material, and allow for higher R-values to be realized for VIG window units and/or for the spacers 5 to be spaced further apart from each other without sacrificing durability. In certain example embodiments of this invention, the material for spacers 5 is designed to have (a) a compressive yield strength of at least 80,000 psi, more preferably at least 100,000 psi, more preferably at least 150,000 psi, and most preferably at least 200,000 psi, and/or (b) thermal conductivity of no greater than 13.0 W/m-K, more preferably no greater than 12.0 W/m-K, even more preferably no greater than 11.0 W/m-K, and most preferably no greater than 10.0 W/m-K or 9.0 W/m-K. Ti based alloys such as Ti-6Al-4V (also known as Titanium 6-4) and Timet 685, and Ni—Mo—Cr inclusive alloys such as Hastelloy C276 may be suitable for spacers 5 in certain example embodiments of this invention. Ti-6Al-4V, for example, in a solution aged heat-treated condition offers improvements in compressive yield strength (155,000 psi) and thermal conductivity (6.7 W/m-K), compared to annealed 316 stainless steel at only 42,000 psi. Other Ti based alloys can be used such as Timet 685. An additional benefit to such titanium alloys is that they are not ferromagnetic or paramagnetic, which allows for ease of pillar placement during manufacturing.

Gas-phase nitriding may optionally be used to increase compressive yield strength. Gas-phase nitriding (e.g., of the Ti based alloy—see chart above) is a secondary heat treating process where nitrogen atoms diffuse into the lattice of titanium alloys. The nitrogen atoms are positioned at interstitial atomic sites which leads to increase flow strength and hardness, without forming significant titanium nitrides on the surface or in the bulk. This is advantageous as thermal conductivity is significantly higher than Ti alloys.

For example, the spacers 5 of the VIG window unit may be of or include a Ti-based metal alloy comprising Ti and one or more of Al and/or V, where the Ti content by weight is at least about 30%, more preferably at least about 40%, and most preferably at least about 50%, and sometimes at least about 60% or at least about 80%. For example, metal content of the spacers 5 may include by weight %, in addition to the Ti, from about 1-20% Al (more preferably from about 2-10%, and most preferably from about 4-8%), and from about 1-20% V (more preferably from about 1-10%, and most preferably from about 2-6%). Ti-6Al-4V (also known as Titanium 6-4) is an example of such a Ti-based alloy.

As another example, the spacers 5 may be of or include a Zr-based amorphous metal alloy comprising Zr and one or more of Cu, Ni, Al, and/or Ti, where the Zr content by weight is at least about 30%, more preferably at least about 40%, and most preferably at least about 50%, and sometimes at least about 60%. Thus, it has been found that using metal alloy spacers (e.g., Ti, Cu, and/or Zr inclusive alloy) advantageously reduces the thermal conductivity of the spacer array and increases the center of glass R-value of the VIG window unit, and can also provide for sufficient spacing strength of the substrates of the VIG window unit. Increasing the compressive yield strength of the spacers in such a manner may allow for increased spacing between adjacent spacers in the window unit, which may allow for higher R-values to be achieved.

The metal alloy of the spacer(s) 5 may be an amorphous metal alloy (e.g., Zr and/or Cu based amorphous alloy) in certain example embodiments. For example, the spacers may be of or include a Zr-based amorphous metal alloy comprising Zr and one or more of Cu, Ni, Al, and/or Ti, where the Zr content by weight is at least about 30%, more preferably at least about 40%, and most preferably at least about 50%, and sometimes at least about 60%. It has been found that using such spacers advantageously reduces the thermal conductivity of the spacer array and increases the center of glass R-value of the VIG window unit, and can also provide for sufficient spacing strength of the substrates of the VIG window unit. Increasing the compressive yield strength of the spacers in such a manner may allow for increased spacing between adjacent spacers in the window unit, which may allow for higher R-values to be achieved.

Amorphous alloys (e.g., VIT 105, VIT 106, VIT 601, AMZ4, or AMC4) for spacers 5 are characterized by their unordered non-crystalline structure compared to metals and other classic alloys. Different metals can be combined with heat and melted together to make a liquid. When this liquid is cooled rapidly, metal atoms retain liquid-like random positions from the melt in forming an amorphous alloy. The alloy system may be chosen in a way such that no significant phase transition from liquid to solid exists which in turn leads to near net shape components that can be manufactured by casting, 3D printing or injection molding (spacers 5 may thus be manufactured by any of these techniques, including but not limited to 3D printing to the glass of the VIG unit). With the absence of lattice defects, few or no grain or phase boundaries, and few or no composition variations exist. Several example Zr and Cu based amorphous alloys, which may be used for spacers 5 herein, are compared to conventional annealed 316 stainless steel spacers below. For example, the VIT 105 amorphous alloy is made up of 16% Cu, 12% Ni, 3% Ti, 4% Al, and the balance (e.g., about 65%) essentially of Zr. As another example, the AMZ4 amorphous alloy is made up of 24% Cu, 4% Al, 2% Nb, and the balance (e.g., about 70%) essentially of Zr. As yet another example, the AMC4 amorphous alloy is made up of 26% Ti, 16% Zr, 8% Ni, 4% Sn, and the balance (e.g., about 46%) essentially of Cu.

| Material | Tg ° C. | Thermal Conductivity | Compressive Yield Strength |
| --- | --- | --- | --- |
| Stainless steel (316 Annealed) | none | 13.5 W/m-K | 42,000 psi |
| Amorphous Alloy VIT105 (Zr—16Cu—12Ni—3Ti—4Al) | 403 | 4.7 W/m-K | 232,000 psi |
| Amorphous Alloy AMZ4 (Zr—24Cu—4Al—2Nb) | 400 | 4.8 W/m-K | 246,000 psi |
| Amorphous Alloy AMC4 (Cu—26Ti—16Zr—8Ni—4Sn) | 410 | ~5 W/m-K | |

It can be seen that the VIT 105, AMZ4, and AMC4 amorphous alloys are advantageous with respect to annealed 316 stainless steel, in that they have lower thermal conductivity and/or higher compressive yield strength.

In certain example amorphous alloy embodiments of this invention for the spacers 5, the amorphous metal alloy for the spacers 5 may be of or include, with respect to metal content of the alloy by weight, at least 40% Zr, more preferably at least 50% Zr, and most preferably at least 60% Zr; from about 1-35% Cu, more preferably from about 10-30% Cu, and most preferably from about 15-25% Cu; from about 1-30% Ni, more preferably from about 5-20% Ni, and most preferably from about 10-15% Ni; from about 1-15% Ti, more preferably from about 1-10% Ti, and most preferably from about 1-5% Ti; and/or from about 1-15% Al, more preferably from about 1-10% Al, and most preferably from about 1-5% Al.

In certain example amorphous alloy embodiments of this invention for the spacers 5, the amorphous metal alloy for the spacers 5 may be of or include, with respect to metal content of the alloy by weight, at least 40% Zr, more preferably at least 50% Zr, and most preferably at least 60% Zr; from about 1-35% Cu, more preferably from about 10-30% Cu, and most preferably from about 15-25% Cu; from about 1-15% Nb, more preferably from about 1-10% Nb, and most preferably from about 1-5% Nb; and/or from about 1-15% Al, more preferably from about 1-10% Al, and most preferably from about 1-5% Al.

In certain example amorphous alloy embodiments of this invention for the spacers 5, the amorphous metal alloy for the spacers 5 may be of or include, with respect to metal content of the alloy by weight, at least 30% Cu, more preferably at least 40% Cu; from about 1-35% Ti, more preferably from about 10-35% Ti, and most preferably from about 20-30% Ti; from about 1-35% Zr, more preferably from about 5-30% Zr, and most preferably from about 10-22% Zr; from about 1-20% Ni, more preferably from about 2-15% Ni, and most preferably from about 5-12% Ni; and/or from about 1-15% Sn, more preferably from about 1-10% Sn, and most preferably from about 2-8% Sn.

Additional heat treating of zirconia-based bulk metallic glass can create zirconium oxide (e.g., $ZrO_2$) on the surface of the pillar. This thin layer of zirconium oxide (e.g., $ZrO_2$) can create a thermal barrier between the bulk amorphous metal pillar and the glass while maintaining the amorphous alloys mechanical properties. The thermal conductivity of $ZrO_2$ is ~1.7 W/m K. A heat treatment in an oxygen rich atmosphere at temperatures of 225 C-275 C for 30 min-60 min, for example, produces a zirconium oxide (e.g., $ZrO_2$) surface oxide on at least one or all sides of the spacer.

Various spacers' calculated thermal conductivity was then imported into a VIG R-value calculator to determine its effect on the thermal performance of a VIG window unit. Ti-6Al-4V (also known as Titanium 6-4 or Ti-6-4) and Heraeus amorphous alloy VIT105 spacers are compared to a stainless-steel pillar below. Due to the increases in compressive strength (e.g., resulting in larger pillar spacing) and decrease in thermal conductivity it is possible, for example and without limitation, for Ti 6-4 and VIT105 to achieve VIG unit R-values of 20.3 and 25.7, respectively (this is much higher than that for conventional stainless steel spacers/pillars). Results of the analysis and parameters that lead to the calculation can be seen below. Note that the Double Ag and Triple Ag refer to different types of low-E coatings on the interior surface of one of the glass substrates of the VIG unit.

| Pillar Material (and Spacing) | R-Value (Double Ag) | R-Value (Triple Ag) |
| --- | --- | --- |
| No Pillars (region away from pillars; radiation only, theoretical maximum): | 39.3 | 60.7 |
| 316 Stainless Steel (40 mm Spacing): | 11 | 12.2 |
| 316 Stainless Steel (Max Spacing = 30 mm): | 7.0 | 7.5 |
| Ti 6-4 SA (40 mm Spacing): | 11.4 | 12.7 |
| Ti 6-4 SA (Max Spacing = 55 mm): | 17 | 20.3 |
| Ti 6-4 SA + Nitriding (40 mm Spacing): | 11.4 | 12.7 |
| Ti 6-4 SA + Nitriding (Max Spacing = 64 mm): | 20.6 | 24.3 |
| Ti 6-5-.5-.25 (40 mm Spacing): | 11.8 | 13.3 |
| Ti 6-5-.5-.25 (Max Spacing = 50 mm): | 15.8 | 18.5 |
| Amorphous AlloyVIT105 (40 mm Spacing): | 11.7 | 13.2 |
| Amorphous AlloyVIT105 (Max Spacing = 64 mm): | 20.7 | 25.7 |
| Amorphous AlloyVIT105 with ZrO2 (40 mm Spacing): | 13.4 | 14.9 |
| Amorphous AlloyVIT105 with ZrO2 (Max Spacing = 64 mm): | 23.2 | 28.1 |

Thus, it will be appreciated that the spacers according to example embodiments of this invention may allow VIG window units to realize higher R-values compared to conventional annealed 316 stainless steel spacers (e.g., pillars).

In an example embodiment of this invention, there is provided a vacuum insulated glass (VIG) window unit, comprising: first and second spaced apart glass substrates defining a gap therebetween; an edge seal provided proximate a periphery of the first and second substrates to form an hermetic seal, and help define the gap which is at a pressure less than atmospheric pressure; a plurality of spacers provided between at least the first and second glass substrates of the VIG window unit for helping space apart at least the first and second glass substrates; and wherein the spacers comprise a metal alloy having a thermal conductivity of no greater than 13.0 W/m-K and a compressive yield strength of at least 80,000 psi.

In the VIG window unit of the immediately preceding paragraph, the spacers may comprise a metal alloy having a thermal conductivity of no greater than 12.0 W/m-K, more preferably no greater than 11.0 W/m-K, more preferably no greater than 10.0 W/m-K, and most preferably no greater than 9.0 W/m-K.

In the VIG unit of any of the preceding two paragraphs, the spacers may comprise a metal alloy having a compressive yield strength of at least 100,000 psi, more preferably a compressive yield strength of at least 150,000 psi, and most preferably a compressive yield strength of at least 200,000 psi.

In the VIG unit of any of the preceding three paragraphs, the metal alloy may be nitrided.

In the VIG unit of any of the preceding four paragraphs, the metal alloy may comprises Ti as the largest metal element, and Ti content of the metal alloy, by weight, may be at least about 30%, more preferably at least about 50%, and most preferably at least about 80%.

In the VIG unit of any of the preceding five paragraphs, metal content of the metal alloy may comprise, by weight, at least 50% Ti, from about 1-20% Al, and from about 1-20% V.

In the VIG unit of any of the preceding six paragraphs, the metal alloy may be amorphous, comprising a non-crystalline structure. Zr or Cu may be the largest metal element content of the amorphous metal alloy.

In the VIG unit of any of the preceding seven paragraphs, metal content of the metal alloy may comprises, by weight, at least 40% Zr.

In the VIG unit of any of the preceding eight paragraphs, metal content of the metal alloy may comprise, by weight, at least 40% Zr and from about 1-35% Cu, and at least one of: from about 1-30% Ni, from about 1-15% Ti, and/or from about 1-15% Al.

In the VIG unit of any of the preceding nine paragraphs, metal content of the metal alloy may comprises, by weight, at least 40% Zr and from about 1-35% Cu, and at least one of: from about 1-15% Nb and/or from about 1-15% Al.

In the VIG unit of any of the preceding ten paragraphs, metal content of the metal alloy may comprise, by weight, at least 30% Cu and from about 1-35% Ti, and at least one of: from about 1-35% Zr, from about 1-20% Ni, and/or from about 1-15% Sn.

In the VIG unit of any of the preceding eleven paragraphs, at least one of the spacers may comprises a coating on a surface thereof. The coating may be of or include a ceramic, such as an oxide of zirconium (e.g., $ZrO_2$). The coating may be on one, two, three, or all sides of at least one of the spacers. The coating may be formed by heat treatment.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vacuum insulated glass (VIG) window unit, comprising:
    first and second spaced apart glass substrates defining a gap therebetween;
    an edge seal provided proximate a periphery of the first and second substrates to form a hermetic seal, and help define the gap which is at a pressure less than atmospheric pressure;
    a plurality of spacers provided between at least the first and second glass substrates of the VIG window unit for helping space apart at least the first and second glass substrates; and
    wherein the spacers comprise an amorphous metal alloy comprising a non-crystalline structure, and wherein the spacers have a thermal conductivity of no greater than 13.0 W/m-K and a compressive yield strength of at least 80,000 psi.

2. The VIG unit of claim 1, wherein the amorphous metal alloy has a thermal conductivity of no greater than 12.0 W/m-K.

3. The VIG unit of claim 1, wherein the amorphous metal alloy has a thermal conductivity of no greater than 11.0 W/m-K.

4. The VIG unit of claim 1, wherein the amorphous metal alloy has a thermal conductivity of no greater than 10.0 W/m-K.

5. The VIG unit of claim 1, wherein the amorphous metal alloy has a thermal conductivity of no greater than 9.0 W/m-K.

6. The VIG unit of claim 1, wherein the amorphous metal alloy has a compressive yield strength of at least 100,000 psi.

7. The VIG unit of claim 1, wherein the amorphous metal alloy has a compressive yield strength of at least 150,000 psi.

8. The VIG unit of claim 1, wherein the amorphous metal alloy has a compressive yield strength of at least 200,000 psi.

9. The VIG unit of claim 1, wherein the amorphous metal alloy is nitrided.

10. The VIG unit of claim 1, wherein Zr or Cu has the largest metal content of the amorphous metal alloy.

11. The VIG unit of claim 1, wherein metal content of the amorphous metal alloy comprises, by weight, at least 40% Zr.

12. The VIG unit of claim 1, wherein metal content of the amorphous metal alloy comprises, by weight, at least 40% Zr and from about 1-35% Cu, and at least one of: from about 1-30% Ni, from about 1-15% Ti, and/or from about 1-15% Al.

13. The VIG unit of claim 1, wherein metal content of the amorphous metal alloy comprises, by weight, at least 40% Zr and from about 1-35% Cu, and at least one of: from about 1-15% Nb and/or from about 1-15% Al.

14. The VIG unit of claim 1, wherein metal content of the amorphous metal alloy comprises, by weight, at least 30% Cu and from about 1-35% Ti, and at least one of: from about 1-35% Zr, from about 1-20% Ni, and/or from about 1-15% Sn.

15. The VIG unit of claim 1, wherein at least one of the spacers comprises a coating on a surface thereof.

16. The VIG unit of claim 15, wherein the coating comprises an oxide of zirconium.

17. The VIG unit of claim 15, wherein the coating comprises ZrO2.

18. The VIG unit of claim 15, wherein the coating is provided on all sides of the at least one spacer.

19. The VIG of claim 1, wherein the metal content of the amorphous metal alloy comprises at least about 50 wt % Zr.

20. The VIG of claim 1, wherein the metal content of the amorphous metal alloy comprises at least about 60% Zr.

21. The VIG of claim 1, wherein the metal content of the amorphous metal alloy comprises about 10-30 wt % Cu.

22. The VIG of claim 1, wherein the metal content of the amorphous metal alloy comprises about 15-25 wt % Cu.

23. The VIG of claim 1, wherein the metal content of the amorphous metal alloy comprises about 5-20 wt % Ni.

24. The VIG of claim 1, wherein the metal content of the amorphous metal alloy comprises about 2-15% Ni.

* * * * *